United States Patent [19]

Smith, III

[11] Patent Number: 6,085,785
[45] Date of Patent: Jul. 11, 2000

[54] UNDERSEA HYDRAULIC COUPLING WITH EXTENDED PROBE SECTION

[75] Inventor: Robert E. Smith, III, Missouri City, Tex.

[73] Assignee: National Coupling Company, Inc., Stafford, Tex.

[21] Appl. No.: 09/293,554

[22] Filed: Apr. 15, 1999

[51] Int. Cl.⁷ .................................................. F16L 37/28
[52] U.S. Cl. .................. 137/614.04; 137/614; 251/149.7
[58] Field of Search .................... 251/149.7; 137/614.04, 137/614

[56] References Cited

U.S. PATENT DOCUMENTS

| 4,637,470 | 1/1987 | Smith, III | 137/614.04 |
|---|---|---|---|
| 4,694,859 | 9/1987 | Smith, III | 137/614.04 |
| 5,015,016 | 5/1991 | Smith, III | 137/614.04 |
| 5,029,613 | 7/1991 | Smith, III | 137/614.04 |
| 5,052,439 | 10/1991 | Smith, III | 137/614.04 |
| 5,232,021 | 8/1993 | Smith | 137/614.04 |
| 5,810,048 | 9/1998 | Zeiner-Gundersen | 137/614.04 |

*Primary Examiner*—A. Michael Chambers
*Attorney, Agent, or Firm*—Fulbright & Jaworski

[57] ABSTRACT

An undersea hydraulic coupling having an extended probe section is disclosed. The male member of the coupling houses a valve spring having a larger diameter than the diameter of the valve body. The valve spring is configured to close the valve to prevent ingress of sea water or leakage of hydraulic fluid from the system. One or more seals engage the extended probe section.

20 Claims, 6 Drawing Sheets

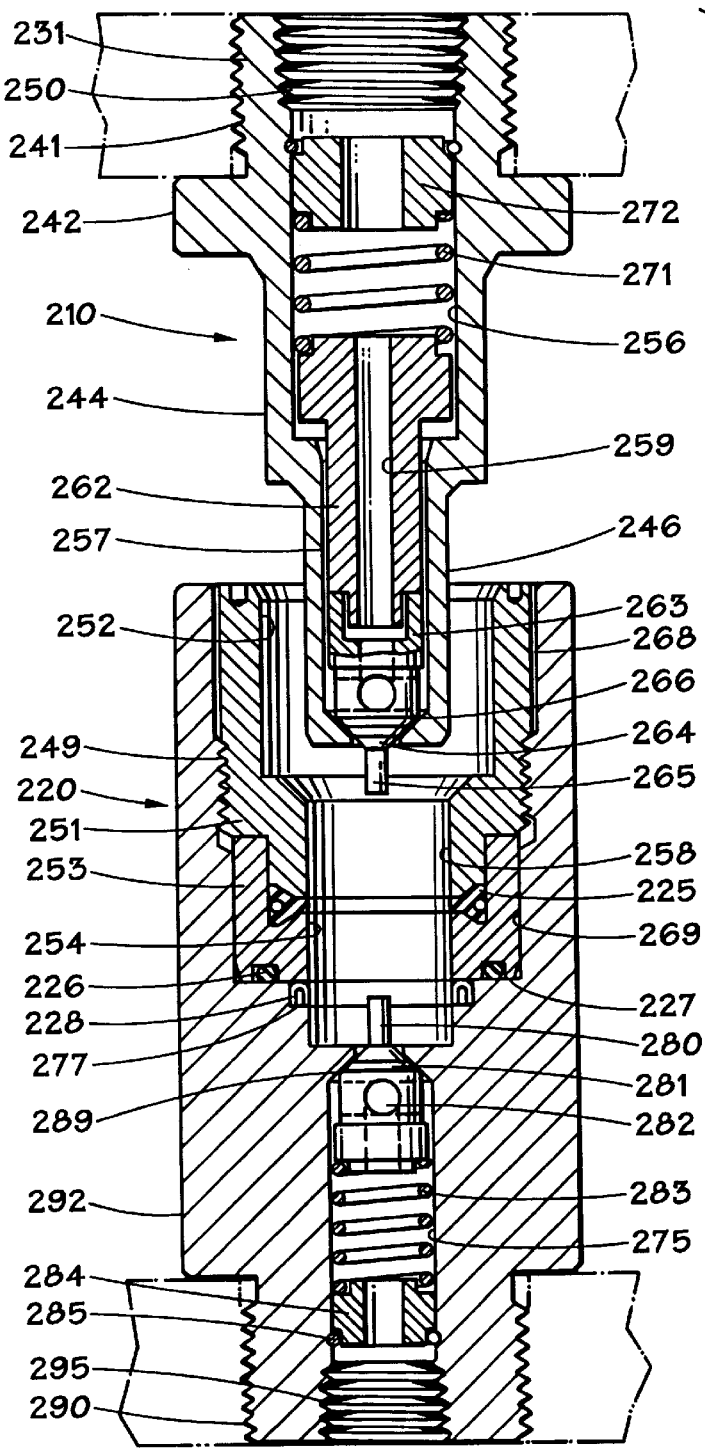
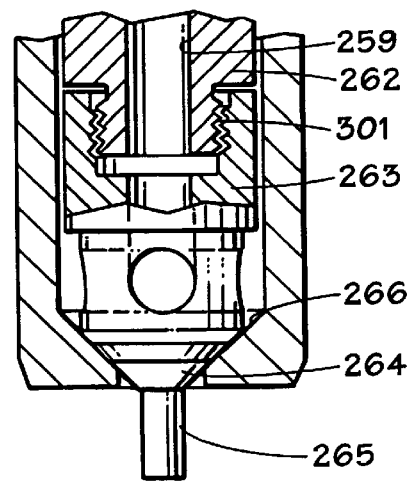
FIG. 6
FIG. 6A

UNDERSEA HYDRAULIC COUPLING WITH EXTENDED PROBE SECTION

BACKGROUND OF THE INVENTION

1. Field of the Invention

The present invention relates generally to hydraulic couplings used in undersea drilling and production applications and seals used in those couplings. More particularly, the invention involves an undersea hydraulic coupling with an extended probe on the male member and a valve spring configured to secure the valve in a closed position to prevent leakage of hydraulic fluid or seawater at high pressure. One or more seals engage the extended probe.

2. Description of Related Art

Subsea hydraulic couplings are old in the art. The couplings generally consist of a male member and a female member, with soft seals positioned within the female member to seal the junction between the male and the female members. The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion, or probe, at one end having a diameter approximately equal to the diameter of the large bore of the female portion of the coupling. The male member also includes a connection at its other end to facilitate connection to hydraulic lines. When the cylindrical portion of the male member is inserted into the large bore of the female member, according to the various embodiments of the device, the soft seals, or O-rings, either abut the end or face of the male member or engage the cylindrical probe wall about its outer circumference. The hydraulic fluid is then free to flow through the female and male members of the coupling and seals prevent that flow from escaping about the joint and the coupling. A check or poppet valve may be installed in the female member and also in the male member. Each valve opens when the coupling is broken so as to prevent fluid from leaking out of the system of which the coupling is a part.

In U.S. Pat. No. 4,694,859 to Robert E. Smith, III, assigned to National Coupling Co., Inc. of Stafford, Tex., an undersea hydraulic coupling and metal seal is disclosed. This patent describes a reusable metal seal which engages the outer circumference of the probe when it is positioned within the female member bore. The metal seal is held in place by a retainer. When the male and female portions of the coupling are parted under pressure, the retainer prevents the metal seal from blowing out through the bore of the female member. The male and female members each have valve actuators extending from the poppet valves. When the valve actuators are engaged, each of the poppet valves is urged open and the poppet valve springs are compressed.

Other subsea hydraulic couplings include seals that engage the face of the male member or probe. For example, U.S. Pat. No. 4,637,470 relates to a coupling having a male member and female member with valves, and a face seal for sealing the junction between the members.

As subsea hydraulic systems are needed for drilling and production applications at increasing depths, the subsea pressure exerts greater forces against the valves in the coupling members. Typically, when the coupling members are disengaged, the male member remains at a subsea location while the female member is removed. The valve spring (typically having a diameter of less than one inch) in the male member may not be adequate to keep the poppet valve completely closed against the hydrostatic forces of sea water. If the valve opens slightly, seawater may enter the hydraulic lines or hydraulic fluid may escape from the system. In known coupling designs for subsea use, increasing the size (i.e., the diameter) of the valve spring would also require increasing the corresponding dimensions of the coupling member, or probe, where the valve spring is positioned. However, increasing the dimensions of the coupling member presents the problem of adequately sealing the coupling members together. Seals for use in undersea hydraulic couplings of the type described herein typically seal around the circumference or face of a probe having an outer diameter of approximately one inch. A seal or seals for engaging a probe having a diameter significantly larger than one inch will be subject to greater hydraulic forces that tend to increase the separation forces between the male and female members and make it more difficult to engage and disengage the coupling members. Therefore, a male coupling member is needed that will be configured to house a larger valve spring to assure that the poppet valve remains closed against the hydrostatic head of the sea, without increasing the dimensions of that portion of the male coupling member where the seal engages.

SUMMARY OF THE INVENTION

The present invention resides in an undersea hydraulic coupling of the foregoing type including male and female members for fluid communication therebetween and valves for controlling fluid flow in each of the members. The present invention includes a male member, or probe, having a body with a stepped external cylindrical surface including an extended probe section with a smaller diameter and a longitudinal passage therethrough. The poppet valve of the male member has an actuator within the longitudinal passage of the extended probe section. The male member houses a valve spring urging the male member poppet valve closed. The valve spring has a diameter greater than the diameter of the extended probe section and provides sufficient force to prevent the poppet valve of the male member from opening at high subsea pressures. The diameter of the portion of the male member housing the spring is greater than the diameter of the extended probe section or the valve in the male member. One or more seals between the coupling members engage the circumference or leading face of the extended probe section.

The present invention prevents leakage of hydraulic fluid or seawater into the hydraulic system at increasing ocean depths, and assures that at higher pressures, a substantially larger diameter valve spring can be housed in the male member of the coupling. The present invention also allows the female member to act as a guide sleeve for precise alignment of the male probe with the female member and seals.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 6 is a cross-section view of the male and female members according to a third preferred embodiment of the present invention.

FIG. 6A is an expanded cross-section view of the poppet valve of the male member of FIG. 6.

DETAILED DESCRIPTION OF PREFERRED EMBODIMENTS

Figure 1:
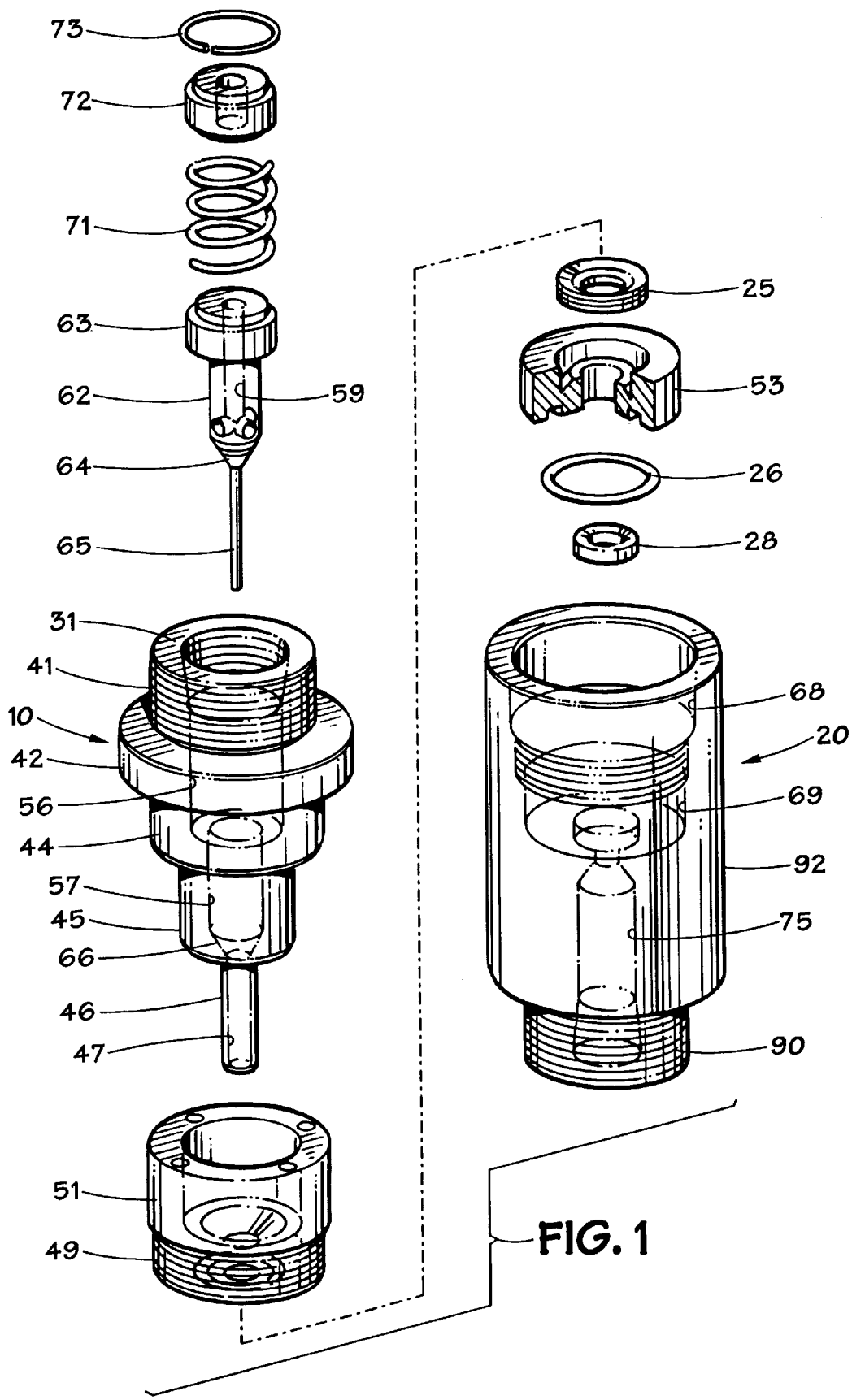
FIG. 1 is an exploded perspective view of the male and female coupling members according to a first preferred embodiment of the present invention.

FIG. 1 is an exploded perspective view of the male member and the female member of a first preferred embodiment of the present invention. The male member 10 may be attached to a manifold plate with threads 41 or other means, such as set screws. Female member 20 may be attached to a second manifold plate by threads 90 or other means. Techniques for attaching the members to such plates are well-known to those skilled in the art.

Male member 10, as shown in FIG. 1, comprises handle 31, flange 42, and a body with an exterior diameter including first section 44 housing valve spring 71, second section 45 with a smaller diameter than the first section, and extended probe section 46 having a diameter smaller than the second section. The length of the extended probe section 46 is preferably greater than its external diameter. Male member 10 has a stepped internal bore extending longitudinally therethrough, with first section 56 of the bore in the first section of the male member, second section 57 of the bore (having a smaller diameter than the first section of the bore) in the second section of the male member, and third section 47 of the bore (having a smaller diameter than the second section of the bore) in the extended probe section 46.

The poppet valve assembly of the male member is slideably received within first section 56, second section 57, and third section 47 of the bore extending longitudinally through the male member. The poppet valve assembly includes cylindrical, hollow valve body 62 with an outer diameter dimensioned to slide within second section 57 of the male member bore. Valve head 64 is conical in shape and is dimensioned to seat on valve seat 66. The conical valve head has an actuator, or stem 65, extending longitudinally therefrom. Cylindrical valve body 62 has an internal bore 59 extending therethrough. Helical valve spring 71 urges the conical valve face 64 into a closed position against valve seat 66. Helical valve spring 71 abuts shoulder 63 of the poppet valve assembly. Valve spring 71 has an external diameter greater than the external diameter of valve body 62. The diameter of valve spring 71 also is greater than the internal diameters of bore 57 or bore 47. Helical valve spring 71 is anchored with spring collar 72, which is held in place by collar clip 73.

Female member 20 includes cylindrical body 92 with a central bore having first section 68, second section 69 having a smaller diameter than the first section, and third section 75 having a smaller diameter than the second section. This stepped bore in the female member is dimensioned to receive retainer sleeve 53 and retainer 51. The retainer sleeve and retainer hold in place a pressure energized hollow metal seal 28 in the female member which forms a radial seal around the circumference of the extended probe section of the male member when inserted through the seal. The hollow metal seal is configured to expand radially inwardly and outwardly in response to fluid pressure in the internal cavity of the seal. Retainer sleeve 53 is slideably inserted into the second section 69 of the female member bore, and preferably has an O-ring to form a back-up seal against shoulder 55 in the female member bore. Additionally, elastomeric dove-tail seal 25 may be configured to seal radially around the extended probe section of the male member. Dove-tail seal 25 has a dove-tail interfit between retainer sleeve 53 and retainer 51. Retainer 51 has threads 49 used to tighten the retainer when those threads engage corresponding threads in first section 68 in the female member bore and the retainer is rotated. By tightening retainer 51 using threads 49, the radial seals may be compressed slightly axially before the coupling members are connected. Retainer 51 in the female member has an internal retainer bore 52 dimensioned to receive the second diameter 45 of the male member.

Figure 2:
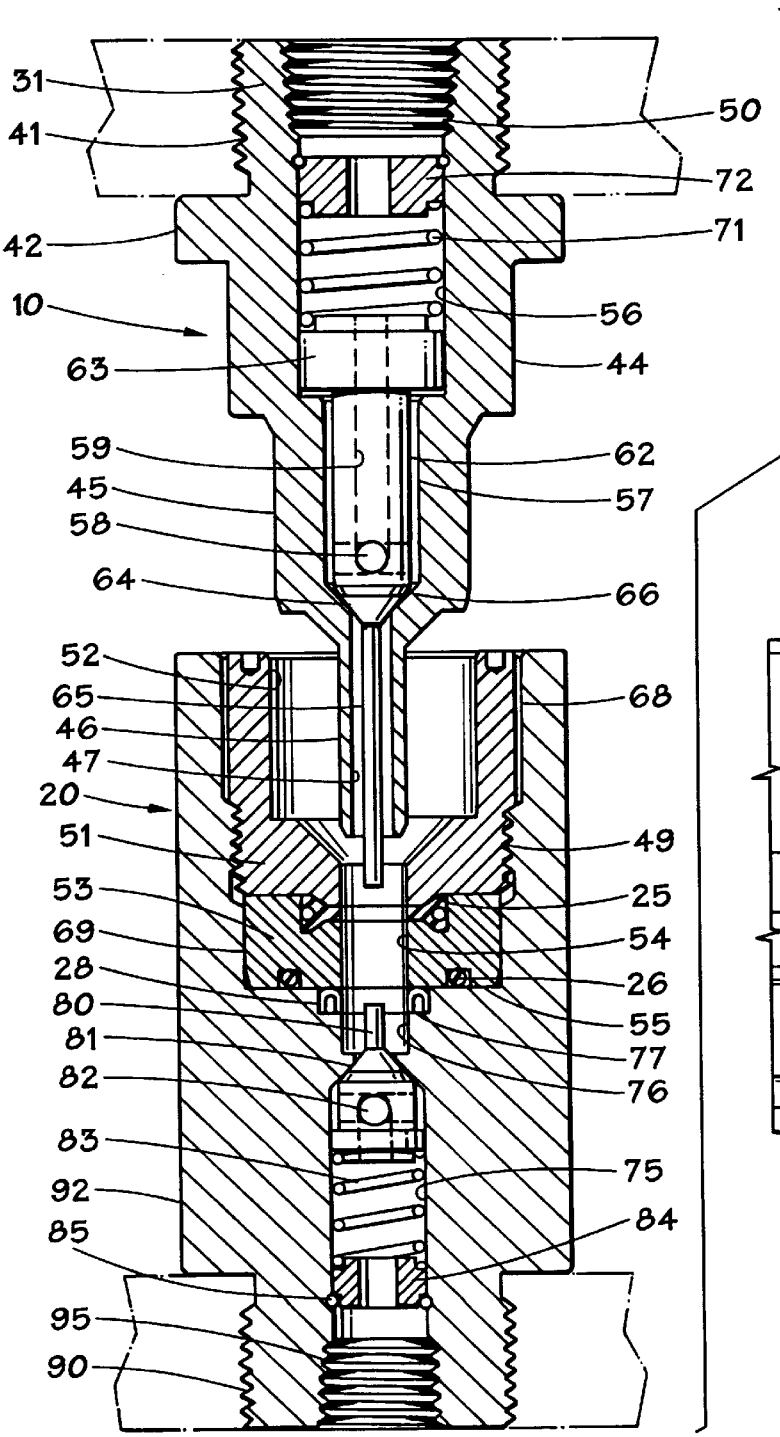
FIG. 2 is a cross-section view of the male and female coupling members according to a first preferred embodiment of the invention, before they are connected.

Now referring to FIG. 2 of the drawing, male member 10 and female member 20 of the coupling are shown in cross-section before hydraulic fluid is transmitted between the coupling members. Male member 10 has an internally threaded section 50 at the handle end thereof to facilitate connection to hydraulic lines. As shown in FIG. 2, valve spring 71 urges the poppet valve into the closed position when the coupling members are disengaged.

The extended probe section 46 may be inserted into sleeve bore 54 before the actuator 65 of the male member poppet valve engages actuator 80 of the female member poppet valve. The female member poppet valve includes a conical valve face 81 and a hollow valve head having an aperture 82 therethrough. Valve spring 83 urges valve face 81 against valve seat 89 in the female member body. The female member poppet valve slides within bore 75 in the female member body. Spring collar 84, which is held in place by collar clip 85, holds valve spring 83 in place. The valve spring urges conical valve face 81 against valve seat 89. The female member has an internally threaded handle 95 to facilitate connection to hydraulic lines.

Figure 3:
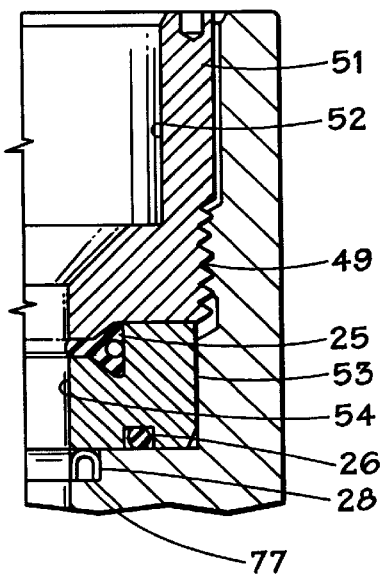
FIG. 3 is an expanded view of the seal retainer and sleeve shown in the female member of FIG. 2.

Retainer sleeve 53 abuts shoulder 55 in the female member bore and, when the retainer 51 is tightened against the retainer sleeve, the hollow metal seal 28 may be slightly compressed axially to preload the seal prior to engagement of the male and female coupling members. Also shown in FIG. 2 is the dove-tail seal between the retainer 51 and the retainer sleeve 53. The dove-tail seal also forms a radial seal around the extended probe section of the male member. Hollow metal seal 28 is positioned on internal shoulder 77 in the female member bore, as shown in FIG. 2 and FIG. 3.

A face-type seal may be used in the present invention instead of a hollow metal seal that engages the circumference of the male member. The face seal is used to engage the leading face of the male member or probe. Additionally, where two seals are used to seal the junction between the male member and female member, the extended probe section of the male member may be stepped so that the elastomeric seal (such as the dove-tail seal shown in FIG. 2) engages on a larger diameter than the metal seal (such as hollow metal seal 28).

Figure 4:
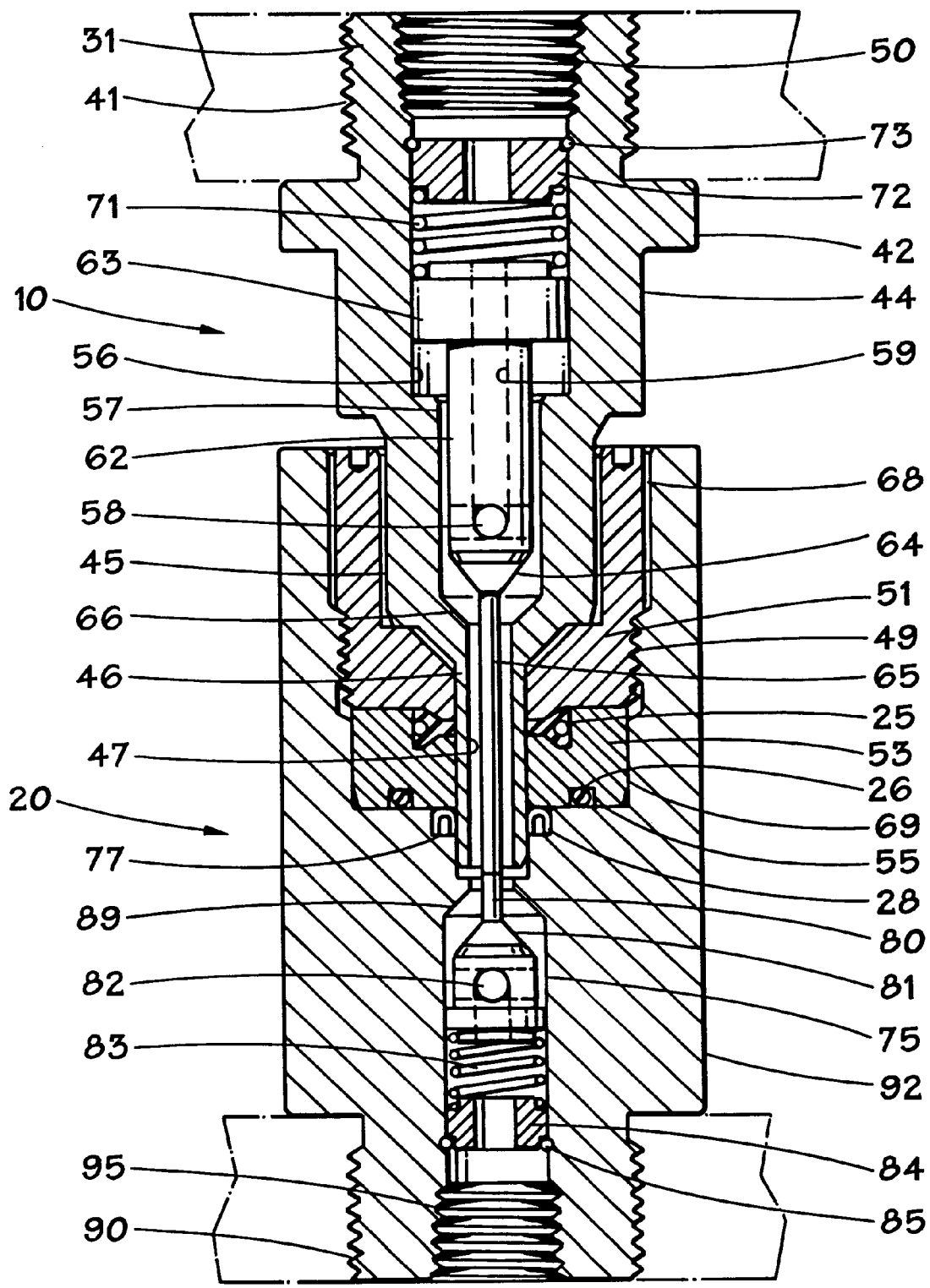
FIG. 4 is a cross-section view of the connected male and female coupling members according to a first preferred embodiment of the present invention.

Now referring to FIG. 4 of the drawing, male and female members of the coupling are shown with the valve actuators mutually engaged so that hydraulic fluid can be transmitted between the coupling members. In this position, hydraulic fluid through the bore of the female member may flow through the female member poppet valve apertures 82, and around the conical valve face 81 until the hydraulic fluid is transmitted into bore 47 surrounding the male member valve actuator 65. Hydraulic fluid passes conical valve face 64 of the male member, and through apertures 58 in cylindrical valve body 62, and through bore 59 in the valve body of the male member.

Figure 5:
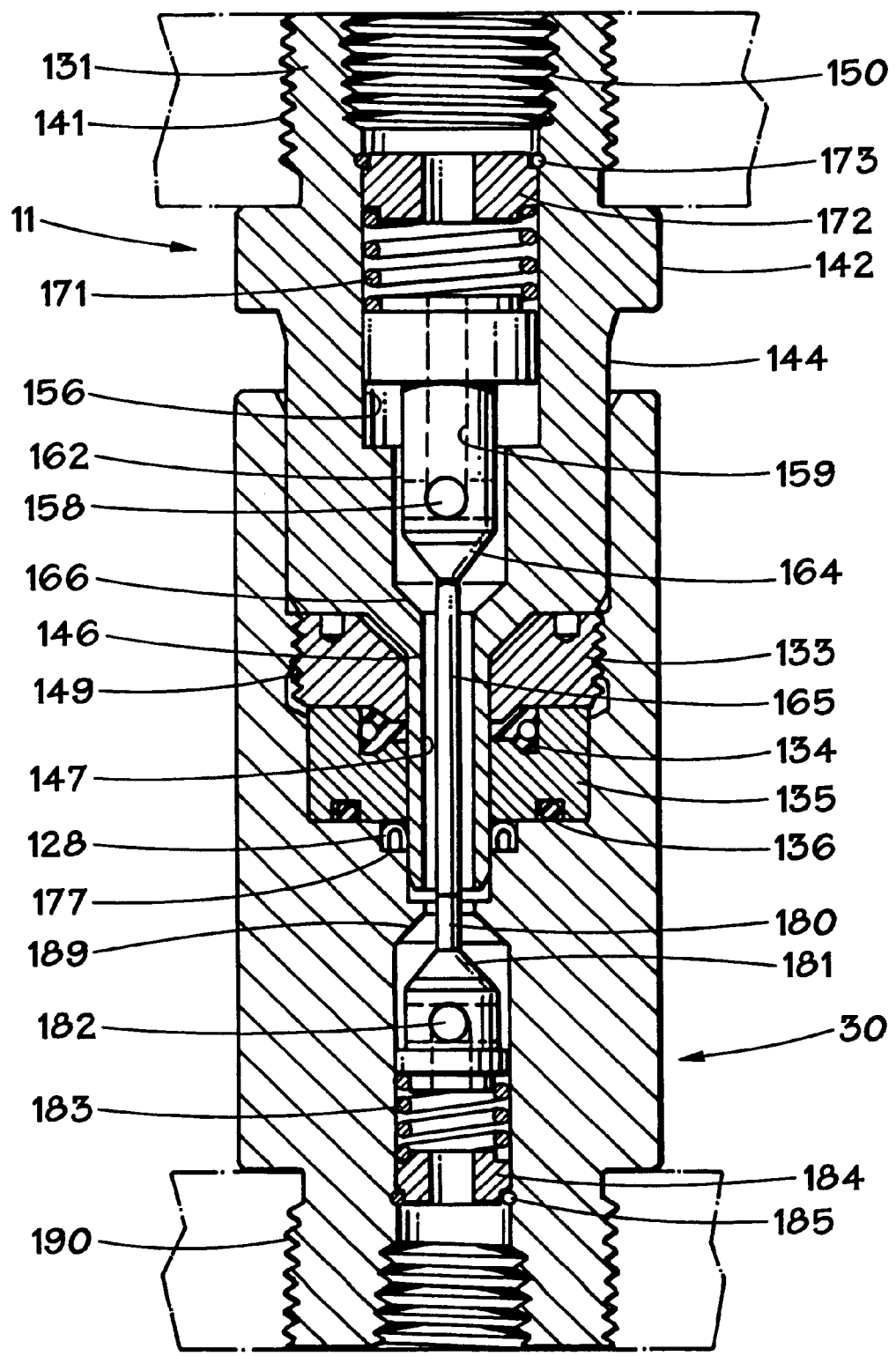
FIG. 5 is a cross-section view of the male and female members connected together according to a second preferred embodiment of the present invention.

In a second preferred embodiment, shown in FIG. 5 of the drawing, male member 11 and female member 30 are shown with the coupling members fully engaged. Male member 11 includes handle 131 with threads 141 that may be connected to a manifold plate. The handle end of the male member also is internally threaded with threads 150 for connection to hydraulic lines. The extended probe section 146 has a bore 147 extending therethrough. The poppet valve assembly of the male member includes cylindrical valve body 162 with conical valve face 164, and valve actuator 165 extending therefrom. The cylindrical valve body has apertures 158 and a longitudinal passage 159 extending therethrough. The poppet valve of the male member is urged into the closed position with valve spring 171 positioned in bore 156 of the male member. Valve spring 171 is anchored by spring collar 172 and collar clip 173. In the embodiment in FIG. 5, the male member body has a flange 142, a first diameter 144, and an extended probe section 146.

Still referring to FIG. 5, female member 30 has an internal bore dimensioned to receive retainer sleeve 135 and retainer 133 which has threads 149 for engagement with mating threads in the internal bore of the female member. The retainer sleeve and retainer each have internal bores extending therethrough dimensioned to allow sliding engagement of the extended probe section 146 of the male member. As in the first embodiment, the extended probe section is greater in length than in its external diameter. As shown in FIG. 5, a dove-tail seal 134 is configured to fit between the retainer sleeve and retainer, and form a radial seal around the circumference of the extended probe section 146. An O-ring seal 136 is preferably positioned between the retainer sleeve and the female member bore. Additionally, hollow metal seal 128 is positioned on shoulder 177 in the female member bore. The hollow metal seal preferably is pressure energized to form a radial metal seal around the circumference of extended probe section 146. The female member also includes a poppet valve assembly having a conical valve face 181 which is urged against valve seat 189 by valve spring 183. The valve spring is held in place with collar 184 and collar clip 185. Preferably, the female member poppet valve includes an aperture 182 allowing the hydraulic fluid to flow through and around the poppet valve when the coupling members are engaged. Female member 30 of the coupling also includes a threaded handle 190. Valve actuator 180 extending from conical valve face 181 will engage the valve actuator 165 of the male member when the coupling members are interconnected. This allows flow of hydraulic fluid between the coupling members.

In a third preferred embodiment of the invention, shown in FIG. 6, male member 210 is attached to a manifold plate with threads 241. Female member 220 may be attached to a second manifold plate by threads 290. Male member 210 comprises handle 231, flange 242, and a body with an exterior diameter including first section 244 housing valve spring 271, and extended probe section 246 having a diameter smaller than the first section. Preferably, the extended probe section has a length greater than its external diameter.

Male member 210 has a stepped internal bore extending longitudinally therethrough, with first section 256 of the bore in the first section of the male member, and second section 257 of the bore (having a smaller diameter than the first section of the bore) in the extended probe section of the male member.

The poppet valve assembly of male member 210 is slideably received within second section 257 of the bore. The poppet valve assembly includes cylindrical, hollow valve body 263 with an outer diameter dimensioned to slide within second section 257 of the male member bore. Valve head 264 is conical in shape and is dimensioned to seat on valve seat 266. The conical valve head has an actuator, or stem 265, extending longitudinally therefrom. As shown in more detail in FIG. 6A, cylindrical valve body 263 includes threads 301 for engagement with spring collar 262, which is dimensioned to slide within bore 257, and has an internal bore 259 therethrough. Helical valve spring 271 abuts spring collar 262, urging the conical valve face 264 into a closed position against valve seat 266. Valve spring 271 has a diameter greater than the external diameter of valve body 263, and the spring diameter also is greater than the internal diameter of bore 257.

Female member 220 includes cylindrical body 292 with a central bore having first section 268, second section 269 having a smaller diameter than the first section, and third section 275 having a smaller diameter than the second section. This stepped bore in the female member is dimensioned to receive retainer sleeve 253 and retainer 251. The retainer sleeve and retainer hold in place a pressure energized hollow metal seal 228 on shoulder 277 in the female member which forms a radial seal around the circumference of the extended probe section of the male member when inserted through the seal. The hollow metal seal is configured to expand radially inwardly and outwardly in response to fluid pressure in the internal cavity of the seal. Retainer sleeve 253 is slideably inserted into the second section 269 of the female bore, and preferably has an O-ring 226 to form a back-up seal against shoulder 227 in the female member bore. Additionally, elastomeric dove-tail seal 225 may be configured to seal radially around the extended probe section of the male member. Dove-tail seal 225 has a dove-tail interfit between retainer sleeve 253 and retainer 251. Retainer 251 has threads 249 used to tighten the retainer when those threads engage corresponding threads in first section 268 in the female member bore and the retainer is rotated. By tightening retainer 251 using threads 249, the radial seal may be compressed slightly axially before the coupling members are connected. Retainer 251 in the female member has an internal retainer bore having a first internal diameter 252 dimensioned to receive the first section 244 of the male member and a second internal diameter 258 (smaller than the first internal diameter 258) dimensioned to receive the extended probe section 246. Retainer sleeve 253 also has an internal diameter 254 dimensioned to receive the extended probe section therethrough.

The extended probe section 246 of the male member may be inserted into retainer bore 258 and sleeve bore 254 before the actuator 265 of the male member poppet valve engages actuator 280 of the female member poppet valve. The female member poppet valve includes a conical valve face 281 and a hollow valve head having an aperture 282 therethrough. Valve spring 283 urges valve face 281 against valve seat 289 in the female member body. The female member poppet valve slides within bore 275 in the female member body. Spring collar 284, which is held in place by collar clip 285, holds valve spring 283 in place. The valve spring urges conical valve face 281 against valve seat 289. The female member has an internally threaded handle 295 to facilitate connection to hydraulic lines.

Retainer sleeve 253 abuts shoulder 227 in the female member bore and, when the retainer 251 is tightened against the retainer sleeve, the hollow metal seal 228 may be slightly compressed axially to preload the seal prior to engagement of the male and female coupling members. Also shown in FIG. 6 is the dove-tail seal between the retainer 251 and the retainer sleeve 253. The dove-tail seal also forms a radial seal around the extended probe section of the male member.

Figure 7:
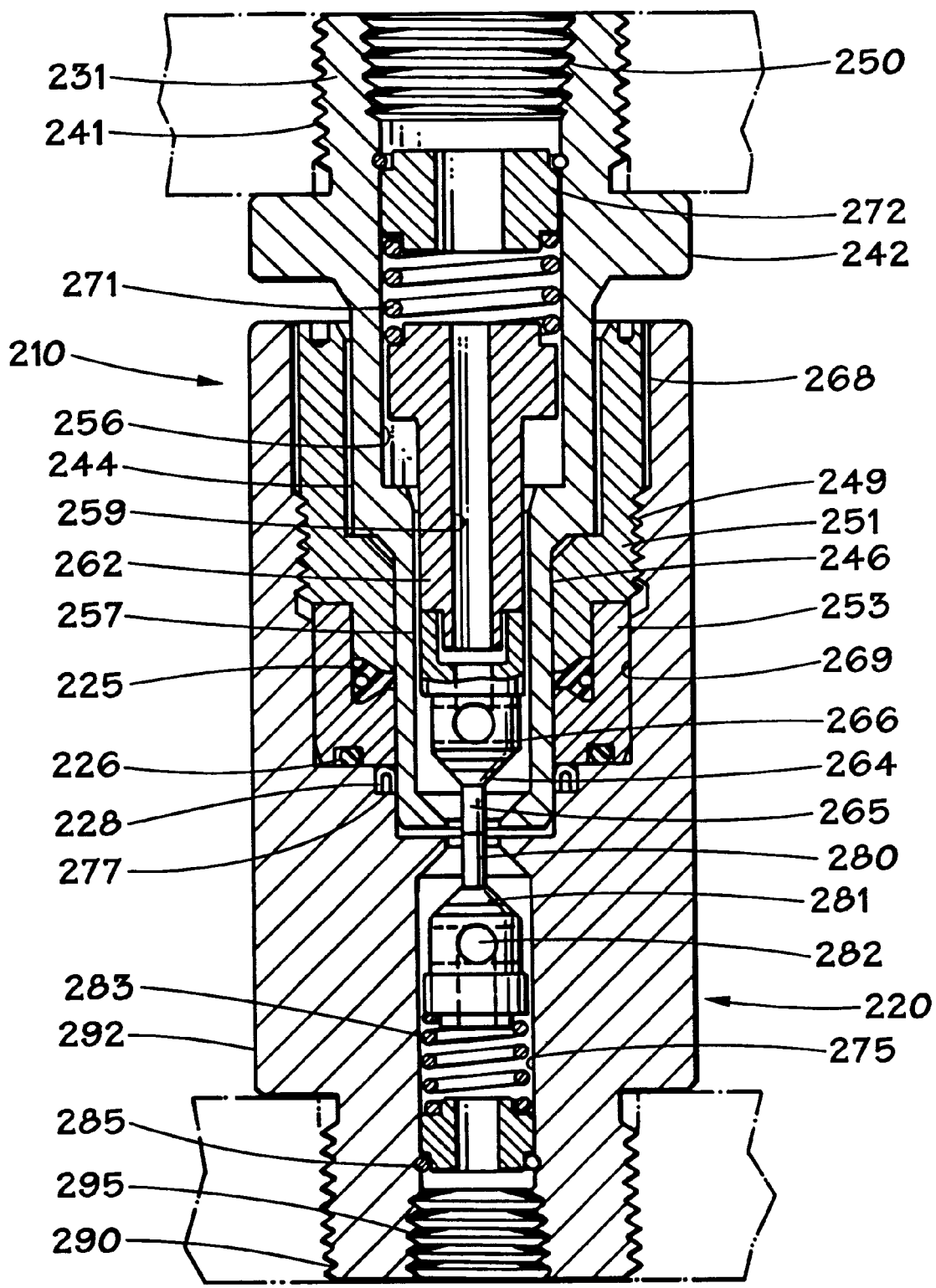
FIG. 7 is a cross-section view of the male and female members connected together according to the third preferred embodiment of FIG. 6.

Now referring to FIG. 7 of the drawing, male and female members of the coupling are shown with the valve actuators mutually engaged so that hydraulic fluid can be transmitted between the coupling members. In this position, hydraulic fluid through the bore of the female member may flow through the female member poppet valve apertures 282, around the conical valve face 281 of the female member, then around the conical valve face 264 of the male member, and into bore 257 in the extended probe section of the male member.

The couplings, according to preferred embodiments of the invention, accommodate a valve spring housed in the first end of the male member that is larger in diameter than the diameter of the valve body or conical valve face in the male member. The larger diameter valve spring housed in the male member allows for significantly greater forces to be applied against the poppet valve to close the valve against the valve seat when the coupling members are disengaged. The invention, therefore, helps prevent hydraulic fluid escaping from the coupling, and helps prevent sea water leaking into the hydraulic lines and hydraulic system of which the coupling members are components. It is desirable to accommodate a valve spring with a larger diameter than the diameter of the cylindrical valve body, the valve face, or the circumferential area engaged by the radial seals between the male and female members. The invention accomplishes this without increasing the forces acting on the radial seal between the male and female members. If desired, a larger valve spring also may be housed in the female member to provide a greater force constant to urge the valve of the female member closed.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling comprising:
   (a) a female member having a body, a central bore, a valve controlling fluid flow through the central bore, and a valve actuator extending longitudinally from the valve; and
   (b) a male member insertable into the central bore of the female member, the male member having a body section and a probe section, a stepped internal bore extending through the body section and the probe section, a valve having a cylindrical body slidable in the internal bore of the body section for controlling fluid flow through the male member, a valve actuator extending longitudinally from the valve and slidable in the internal bore of the probe section, and a valve spring urging the valve into the closed position, the valve spring having a diameter larger than the diameter of the probe section and larger than the diameter of the cylindrical body of the valve.

2. The undersea hydraulic coupling of claim 1 wherein the central bore of the female member comprises a first section, a second section having a diameter smaller than the first section, and a third section having a diameter smaller than the second section.

3. The undersea hydraulic coupling of claim 1 further comprising a radial seal in the central bore of the female member, the radial seal engaging the outer circumference of the probe section of the male member, the radial seal having a diameter smaller than the diameter of the valve spring.

4. An undersea hydraulic coupling comprising:
   (a) a male member having an internal bore, a valve for controlling fluid flow through the bore, the valve having a valve actuator extending therefrom and a valve spring urging the valve closed, the male member also having a first section housing the valve spring, and a second section having an outer diameter smaller than the outer diameter of the first section, the valve slidable in the second section, and a third section having an outer diameter smaller than the outer diameter of the second section, the valve actuator slidable in the third section; and
   (b) a female member having a stepped receiving chamber for receiving the male member, an internal bore, a valve for controlling fluid flow through the internal bore, the valve having a valve actuator extending therefrom, the valve actuators of the male and female members being mutually engageable to open the valves and transmit hydraulic fluid between the coupling members.

5. The undersea hydraulic coupling of claim 4 further comprising at least one radial seal positioned in the stepped receiving chamber of the female member, the radial seal engageable with the third section of the male member.

6. The undersea hydraulic coupling of claim 5 further comprising a seal retainer for holding the radial seal in place upon separation of the male and female coupling members.

7. The undersea hydraulic coupling of claim 6 wherein the radial seal is an elastomeric seal having a dovetail interfit with the seal retainer.

8. The undersea hydraulic coupling of claim 5 wherein the radial seal is a hollow metal seal.

9. An undersea hydraulic coupling comprising:
   (a) a male member having a first section and a second section, an internal passage through the male member having a first section and a second section, the first section of the internal passage having a larger diameter than the second section of the internal passage, a valve with a cylindrical body slideable in the second section of the internal passage, the valve spring housed in the first section of the passage for urging the valve closed, the valve having a sealing face and an actuator extending from the sealing face, the valve spring having a larger diameter than the diameter of the cylindrical body of the valve; and
   (b) a female member engageable with the male member and having a valve slideable in an internal passage therethrough, the valve having an actuator extending therefrom, wherein the valve actuators are mutually engageable to open the valves to transmit hydraulic fluid between the members.

10. The undersea hydraulic coupling of claim 9 further comprising at least one radial seal for sealingly engaging the outer circumference of the second section of the male member and the internal passage in the female member.

11. The undersea hydraulic coupling of claim 10 wherein the second section of the male member has a first diameter and a second diameter, one of the radial seals engaging the first diameter and one of the radial seals engaging the second diameter.

12. The undersea hydraulic coupling of claim 11 wherein the radial seal is a pressure-energized hollow metal seal.

13. The undersea hydraulic coupling of claim 9 further comprising at least one face seal for sealingly engaging the end of the second section of the male member and the internal passage in the female member.

14. The undersea hydraulic coupling of claim 9 wherein the second section of the male member is greater in length than in external diameter.

15. The undersea hydraulic coupling of claim 9 further comprising a retainer inserted into the internal passage of the female member, the retainer having a stepped internal diameter to receive the first section and second section of the male member, the retainer holding at least one radial seal in the female member.

16. The undersea hydraulic coupling of claim 15 further comprises a retainer threaded to the female member, a sleeve slideable into the internal passage of the female member, and a radial seal positioned between the retainer and sleeve.

17. The undersea hydraulic coupling of claim 16 wherein the radial seal has a dovetail interfit between the retainer and sleeve.

18. The undersea hydraulic coupling of claim 9 wherein the male member further comprises a third section having an outer diameter smaller than the second section.

19. The undersea hydraulic coupling of claim 18 wherein the third section of the male member has an internal bore, the valve actuator of the male member extending through the internal bore of the third section.

20. The undersea hydraulic coupling of claim 9 further comprising a spring collar slidable in the second section of the male member, the spring collar connected to the valve of the male member.

* * * * *